US008127900B2

(12) United States Patent
Inoue

(10) Patent No.: US 8,127,900 B2
(45) Date of Patent: Mar. 6, 2012

(54) ELECTROMAGNETIC SHOCK ABSORBER FOR VEHICLE

(75) Inventor: Hirofumi Inoue, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1003 days.

(21) Appl. No.: 12/089,441

(22) PCT Filed: Sep. 21, 2006

(86) PCT No.: PCT/JP2006/319391
§ 371 (c)(1),
(2), (4) Date: Apr. 7, 2008

(87) PCT Pub. No.: WO2007/043352
PCT Pub. Date: Apr. 19, 2007

(65) Prior Publication Data
US 2009/0121398 A1    May 14, 2009

(30) Foreign Application Priority Data
Oct. 7, 2005  (JP) ................................ 2005-295084

(51) Int. Cl.
*F16F 15/03*    (2006.01)
(52) U.S. Cl. ..................................... 188/267; 188/266.1
(58) Field of Classification Search ............... 188/266.1, 188/299.1, 267, 316, 317, 318
See application file for complete search history.

(56) References Cited

U.S. PATENT DOCUMENTS

| 5,060,959 | A | * | 10/1991 | Davis et al. | 280/5.514 |
| 5,293,969 | A | * | 3/1994 | Yamaoka et al. | 188/266.5 |
| 5,678,847 | A | * | 10/1997 | Izawa et al. | 280/5.515 |
| 6,476,702 | B1 | | 11/2002 | Hartwig et al. | |
| 2005/0016802 | A1 | * | 1/2005 | Akami et al. | 188/267 |

FOREIGN PATENT DOCUMENTS

| DE | 82 22 808 U1 | 2/1983 |
| EP | 0 343 809 A2 | 11/1989 |
| EP | 0 343 809 A3 | 11/1989 |
| EP | 0 397 488 A1 | 11/1990 |
| EP | 0 616 412 A1 | 9/1994 |
| EP | 0 811 784 A2 | 12/1997 |
| EP | 0 811 784 A3 | 12/1997 |
| JP | 2-88318 | 3/1990 |
| JP | 4 300709 | 10/1992 |

(Continued)

*Primary Examiner* — Robert Siconolfi
*Assistant Examiner* — Anna Momper
(74) *Attorney, Agent, or Firm* — Oblon, Spivak, McClelland, Maier & Neustadt, L.L.P.

(57) ABSTRACT

An electromagnetic shock absorber including: (a) a wheel-side member; (b) a body-side member movable relative to the wheel-side member; and (c) a damping force generator with an electromagnetic motor including stationary and movable elements movable relative to each other. The damping force generator can generate, based on a force generated by the motor, a damping force acting against a relative movement of the wheel-side member and the body-side member. The motor has an axis extending in a both-members-relative-movement direction as a direction of the above-described relative movement. The stationary element is supported by the wheel-side member via an elastic body, to be movable relative to the wheel-side member in the both-members-relative-movement direction. The electromagnetic motor allows relative movement of the stationary element and the movable element upon movement of the stationary element relative to the wheel-side member.

10 Claims, 7 Drawing Sheets

FOREIGN PATENT DOCUMENTS

| | | |
|---|---|---|
| JP | 5 44754 | 2/1993 |
| JP | 5 65007 | 3/1993 |
| JP | 5-286335 | 11/1993 |
| JP | 2503258 | 6/1996 |
| JP | 8 197931 | 8/1996 |
| JP | 10 246270 | 9/1998 |
| JP | 2004 197815 | 7/2004 |
| JP | 2005 81912 | 3/2005 |
| JP | 2005 90616 | 4/2005 |
| JP | 2005 264992 | 9/2005 |
| WO | WO 2004/071793 A1 | 8/2004 |

\* cited by examiner (a)

(b)

ELECTROMAGNETIC SHOCK ABSORBER FOR VEHICLE

TECHNICAL FIELD

The present invention relates in general to a shock absorber that constitutes a vehicle suspension system, and more particularly to an electromagnetic shock absorber having an electromagnetic motor and capable of generating a damping force based on a force of the electromagnetic motor.

BACKGROUND ART

In recent years, there is a study of construction of a suspension system using an electromagnetic shock absorber. In general, the shock absorber has a wheel-side member connected to a wheel holder that is constructed to include a suspension arm and a body-side member connected to a mount portion that is provided in a particular portion of a vehicle body such as an upper portion of a tire housing, and is configured to generate a damping force acting against a relative movement of the wheel-side member and the body-side member upon a vertical movement of a vehicle wheel and the vehicle body toward and away from each other. The electromagnetic shock absorber (hereinafter referred to as "electromagnetic absorber" where appropriate) is configured to generate the damping force based on a force generated by an electromagnetic motor that is included in the electromagnetic shock absorber. As a technique relating to such an electromagnetic shock absorber, there exists a technique as disclosed in a patent document as identified below, for example.

Patent Document 1: JP-H08-197931A

DISCLOSURE OF THE INVENTION

(A) Outline of the Invention

In the electromagnetic absorber disclosed in the above-identified patent document, a motor housing holding a stator (as a stationary element) is elastically supported by the body-side member, and a motor shaft provided with a rotor (as a rotatable element that is a kind of movable element) is fixedly connected to an externally threaded rod that is held in thread engagement with a nut provided in the wheel-side member. In the thus constructed absorber, it is intended to prevent locking of the absorber upon application of an impact load from the wheel and to effectively cope with vibrations caused by the impact load.

In general, the electromagnetic absorber is constructed such that the electromagnetic motor receives various vibrations, and it is desirable to alleviate the vibrations, as much as possible, which act on the electromagnetic motor, for example, in view of durability of the electromagnetic motor. In the electromagnetic absorber disclosed in the above-identified patent document, although the electromagnetic motor per se is supported in an elastic manner, namely, although there is an arrangement for alleviating the vibrations acting on the motor, such a vibration alleviation arrangement is not satisfactorily sufficient.

The above-described problem relating to the vibrations acting on the electromagnetic motor is merely one of problems encountered in the electromagnetic absorber. The electromagnetic absorber has not only the above-described problem but also various problems that are similar to or different from the above-described problem, so that usability of the electromagnetic absorber can be increased by solving any one of the various problems. That is, in the conventional electromagnetic absorber, there is still room for improvement for increasing the usability. The present invention was made in the light of the background art discussed above, and has an object of the invention to provide an electromagnetic shock absorber having a high usability.

For achieving the above object, the vehicle electromagnetic shock absorber of the present invention has an electromagnetic motor that is supported by one of a wheel-side member and a body-side member and is capable of generating, based on a force generated by the electromagnetic motor, a damping force acting against a relative movement between the wheel-side member and the body-side member. The electromagnetic shock absorber of the present invention is characterized in that a relative movement of a stationary element and a movable element of the motor is allowed and in that the stationary element is elastically supported by one of the wheel-side member and the body-side member.

In the electromagnetic shock absorber of the present invention, relative vibrations of the vehicle body and the wheel are restrained from being transmitted to the motor, owing to the arrangement in which the electromagnetic motor is elastically supported at the stationary element, and the motor is restrained from being affected by influence of the transmitted relative vibrations, owing to the arrangement in which the relative movement of the stationary element and the movable element is allowed. Thus, in the electromagnetic shock absorber of the present invention, the motor is sufficiently protected from the vibrations. In this sense, the electromagnetic shock absorber of the present invention is given a high usability in the practical use.

(B) Modes of the Claimable Invention

There will be described various modes of the invention (hereinafter referred to as "claimable invention" where appropriate) deemed to contain claimable features for which protection is sought. Each of these modes of the invention is numbered like the appended claims and depends from the other mode or modes, where appropriate, for easier understanding of the technical features disclosed in the present specification. It is to be understood that the claimable invention is not limited to the technical features or any combinations thereof which will be described in each of these modes. That is, the scope of the claimable invention should be interpreted in the light of the following descriptions accompanying the various modes and preferred embodiments of the invention. In a limit in accordance with such an interpretation, a mode of the claimable invention can be constituted by not only any one of these modes but also either a mode provided by any one of these modes and additional component or components incorporated therein and a mode provided by any one of these modes without some of components recited therein.

(1) An electromagnetic shock absorber for a vehicle, including:

a wheel-side member to be connected to a wheel holder that holds a wheel of the vehicle;

a body-side member to be connected to a mount portion that is provided in a body of the vehicle, and movable relative to the wheel-side member upon a movement of the wheel holder and the mount portion toward and away from each other; and a damping force generator having an electromagnetic motor that includes a stationary element and a movable element movable relative to each other, the damping force generator being capable of generating, based on a force generated by the electromagnetic motor, a damping force acting against a relative movement of the wheel-side member and the body-side member, wherein the electromagnetic motor is disposed to have a posture that causes an axis of the electromagnetic motor to extend in a both-members-relative-movement direction as a direction of the relative movement of the wheel-side member and the body-side member, wherein the stationary element is supported by one of the wheel-side member and the body-side member via an elastic body such that the stationary element is movable relative to the one of the wheel-side member and the body-side member in the both-members-relative-movement direction, and wherein the electromagnetic motor has a construction allowing a relative movement of the stationary element and the movable element upon a movement of the stationary element relative to the one of the wheel-side member and the body-side member.

The electromagnetic absorber of the present mode is, briefly described, characterized in that the electromagnetic motor serving as a damping force generating source is configured to allow the relative movement of the stationary element and the movable element in a direction of an axis of the electromagnetic motor, and in that the stationary element is elastically supported by one of the wheel-side member and the body-side member. Described more plainly, the present mode is a mode in which the stationary element is supported in a floating manner by one of the wheel-side member and the body-side member. According to the present mode, it is possible to alleviate the vibrations transmitted from the vehicle body and the wheel to the electromagnetic motor is alleviated, and also to effectively prevent or reduce a negative influence of the transmitted vibrations affecting the electromagnetic motor. Described in detail, it is possible to effectively absorb a force causing the stationary element and the movable element to be moved relative to each other, which force is caused by the vibrations, whereby the electromagnetic absorber can be constructed to be advantageous in strength and durability of the electromagnetic motor so that the electromagnetic motor can be further protected from the vibrations. Regarding the term "shock absorber", the shock absorber recited in the present mode may be referred to as "suspension cylinder device" or "cylinder device" in view of conventional existence of a hydraulic shock absorber, and may be referred also to as "electromagnetic actuator" in view of a fact that it can be configured to positively cause the body-side member and the wheel-side member to be moved relative to each other by the force of the electromagnetic motor.

In the electromagnetic absorber of the present mode, a construction of each of the "wheel-side member" and the "body-side member" is not particularly limited, as long as the wheel-side member is arranged to be movable together with a suspension arm, a steering knuckle or the like which constitutes the wheel holder and to which the absorber is to be attached, while the body-side member is arranged to be movable together with the mount portion which is provided in a portion of the vehicle body such as an upper portion of a tire housing and to which the absorber is to be attached. Further, each of the wheel-side member and the body-side member may be constituted by either a single piece or respective pieces that are collectively or integrally assembled to each other.

In the present mode, a construction of the "damping force generator" is not particularly limited as long as the damping force generator has the electromagnetic motor as the damping force generating source. For example, the damping force generator may have a motion converter such as a screw mechanism and a gear mechanism as described below. The force generated by the damping force generator can be adapted to serve as the damping force acting against the relative movement (hereinafter referred to as "both-members relative movement" where appropriate). The "both-members-relative-movement direction" as a direction of the both-members relative movement can be considered as a direction parallel to a line connecting two connection positions, wherein one of the two connection positions corresponds a position in which the wheel holder and the wheel-side member are connected to each other, while the other of the two connection positions corresponds to a position in which the mount portion and the body-side member are connected to each other. Since the line connecting the two connection positions can be considered as an axis (hereinafter referred to as "absorber axis" where appropriate) of the electromagnetic absorber, the above-described both-members-relative-movement direction is hereinafter referred to as "absorber axial direction" or simply "axial direction" where appropriate.

A construction of the "electromagnetic motor" included in the damping force generator is not particularly limited. It is possible to employ, as the electromagnetic motor, any one of various kinds of motors, as long as it has the stationary element (hereinafter referred to as "stator" where appropriate) and the movable element (hereinafter referred to as "mover" where appropriate) that are opposed to each other and is configured such that an electromagnetic force acts between the stationary and movable elements. Each one of the stationary and movable elements is a concept relative to the other of the stationary and movable elements. Thus, for convenience of the description, one of the elements that is supported by one (hereinafter referred to as "one-side member" where appropriate) of the wheel-side member and the body-side member, i.e., one of the elements that is less movable relative to the one-side member is referred to as the stationary element, while the other of the elements that is more movable relative to the one-side member is referred to as the movable element. Therefore, in case of the electromagnetic motor that is constructed to have a permanent magnet and an electromagnetic coil as one and the other of the stationary and movable elements, either one of the permanent magnet and the electromagnetic coil may be arranged to serve as the stationary element, and either one of the permanent magnet and the electromagnetic coil may be arranged to serve as the movable element.

In the present mode, the electromagnetic motor is disposed such that its axis (hereinafter referred to as "motor axis" where appropriate) is parallel to the absorber axis (for example, such that both of the motor and absorber axes are coincident with each other) whereby the stationary element and the movable element are allowed to be moved relative to each other in a direction of the motor axis. Specifically described, the damping force generator may be constructed to include, as the electromagnetic motor, a linear motor that is disposed such that the movable element is movable relative to the stationary element in a direction parallel to the above-described axial direction, or may be constructed to include, as the electromagnetic motor, a rotary motor that is disposed such that a rotatable element (hereinafter referred to as "rotor" where appropriate) as the movable element is rotatable about a rotary axis parallel to the axial direction. Further, a construction of the "elastic body" that supports the stationary element in an elastic manner is not particularly limited. For example, as the elastic body, any one of various kinds of springs such as a coil spring or a rubber may be employed as the elastic body, as long as the stationary element is attached to the one-side member via the elastic body. It is noted that the present mode encompasses a mode in which the stationary element is supported by the one-side member via two or more elastic bodies.

The electromagnetic absorber of the present mode may have a construction in which a force is generated by the electromagnetic motor according to an electric power supplied to the electromagnetic motor, whereby the force acts as a resistance against the both-members relative movement, so as to generate the damping force based on the resistance. Further, in place of or in addition to such a construction, the electromagnetic absorber of the present mode may have a construction in which an electromotive force is generated in the electromagnetic motor as a result of the both-members relative movement, and an electric current regenerated in the electromagnetic motor by the electromotive force is consumed, whereby the electromotive force acts as a resistance against the both-members relative movement, so as to generate the damping force based on the resistance. Further, the electromagnetic absorber of the present mode may be arranged to exclusively exhibit a function of generating the damping force against the both-members relative movement, or may be arranged to exhibit, in addition to that function, a function of positively moving the wheel holder and the mount portion toward and away from each other, by positively moving the wheel-side member and the body-side member relative to each other owing to a drive force of the electromagnetic motor, in other words, by generating a propulsion force propelling the relative movement of the wheel-side member and the body-side member owing to the drive force of the electromagnetic motor.

(2) The electromagnetic shock absorber according to mode (1), wherein the stationary element of the electromagnetic motor is supported by the wheel-side member as the one of the wheel-side member and the body-side member.

The present mode can be, briefly described, considered as a mode in which the electromagnetic motor is disposed on the side of the wheel-side member. In the shock absorber employed in a suspension system, commonly, many vibrations are inputted thereto via the wheel-side member. Therefore, where the electromagnetic motor is provided in the wheel-side member, a greater consideration has to be paid to the vibrations inputted to the motor than where the electromagnetic motor is provided in the body-side member. From a point of view of this, in the present mode in which the motor is elastically supported by the wheel-side member, it is possible to satisfactorily enjoy the above-described effects provided by the arrangement in which the relative movement of the stationary and movable elements are allowed while the motor is elastically supported.

(3) The electromagnetic shock absorber according to mode (1) or (2), wherein the stationary element of the electromagnetic motor includes an electromagnetic coil, while the movable element of the electromagnetic motor includes a permanent magnet.

As described above, in comparison between the stationary and movable elements, generally, the movable element is moved relative to the one-side member by a larger amount than the stationary element. For example, where the electromagnetic motor is a rotary motor, where the rotatable element as the movable element is constructed to have the coil, this construction requires brushes to be in sliding contact with the rotatable element for energizing the motor, and the brushes have to be arranged to function satisfactorily even during rotation of the motor at a high velocity. That is, where the movable element includes the coil, a higher durability is required in the arrangement for energizing the motor. On the other hand, in the present mode, since the stationary element, which is to be moved relative to the above-described one-side member by a relatively small amount, has the coil, it is possible to simplify the arrangement for the energization of the electromagnetic motor, for example, by employing a DC brushless motor. Further, even where the brushes are used for establishing electrical connection, it is possible to provide the electromagnetic absorber with a high reliability, without a great consideration paid for the durability of the energizing arrangement.

(4) The electromagnetic shock absorber according to any one of modes (1)-(3), wherein the electromagnetic motor is a rotary motor such that the movable element is a rotatable element that is rotatable relative to the stationary element.

The present mode is a mode in which the motor can be protected from the vibrations applied to the motor in case of employment of the rotary motor as the electromagnetic motor. The rotary motor is employed in most of electromagnetic absorbers that are currently studied. In this sense, the present mode can be considered as a mode applicable to various purposes. The rotary motor is configured to generate the force owing to the rotation of the rotatable element about the motor axis, so that the damping force based on the force generated by the motor is not affected directly by the relative movement of the stationary element and the rotatable element in the direction of the motor axis. Therefore, in the present mode, the motor can be controlled to control the damping force in a relatively simple manner that is substantially the same as in case in which the stationary element is supported in a non-elastic manner. It is preferable that a length of one of the stationary element and the movable element as measured in the direction of the motor axis is larger than a length of the other of the stationary element and the movable element as measured in the direction of the motor axis by an amount that is dependent on a movement range over which the stationary element and the movable element are to be moved relative to each other in the direction of the motor axis, so that the motor can generate a constant amount of the force acting in a direction of its rotation, irrespective of a relative position of the stationary element and the movable element in the direction of the motor axis within the movement range. Further, in the present mode, the motor axis and the absorber axis may be coaxial with each other, namely, aligned with each other, or may be offset from each other as long as they are parallel to each other.

(5) The electromagnetic shock absorber according to mode (4), wherein the damping force generator has a screw mechanism which includes an externally threaded portion and an internally threaded portion that are held in thread engagement with each other, and which is disposed to have a posture that causes an axis of the screw mechanism to extend in the both-members-relative-movement direction, such that one of the externally threaded portion and the internally threaded portion is provided in the one of the wheel-side member and the body-side member, and is rotatable relative to the one of the wheel-side member and the body-side member, such that the other of the externally threaded portion and the internally threaded portion is provided in the other of the wheel-side member and the body-side member, and is unrotatable relative to the other of the wheel-side member and the body-side member, and such that the one of the externally threaded portion and the internally threaded portion is rotatable upon the relative movement of the wheel-side member and the body-side member, and wherein the stationary element of the electromagnetic motor is held by the one of the wheel-side member and the body-side member such that the stationary element is unrotatable relative to the one of the wheel-side member and the body-side member, while the rotatable element is rotatable in association with a rotation of the one of the externally threaded portion and the internally threaded portion, whereby the damping force generator is capable of generating, based on the force generated by the electromagnetic motor, the damping force acting against the relative movement of the wheel-side member and the body-side member.

The present mode is a mode which has a specific limitation as to the construction of the rotary motor employed as the electromagnetic motor. The "screw mechanism" recited in the present mode is a kind of motion converter for converting a linear motion in the form of the both-members relative movement, into a rotary motion in the form of a relative rotation of the externally threaded portion and the internally threaded portion. This screw mechanism is preferably a mechanism generating a minimum friction. In this sense, for example, it is preferable to employ, as the screw mechanism, a ball screw mechanism constructed to include a screw rod which has an external thread groove formed therein and a nut which has an internal thread groove formed therein and which is held in thread engagement with the screw rod via bearing balls. The screw mechanism may be constructed such that one of the externally threaded portion and internally threaded portion of the screw mechanism is unrotatable relative to one of the wheel-side member and body-side member while the other of the externally threaded portion and internally threaded portion is rotatable relative to the one of the wheel-side member and body-side member and is movable in association with the rotatable element of the motor. Further, each of the externally threaded portion and internally threaded portion may be provided by either a part of a corresponding one of the wheel-side member and body-side member, or another member attached to the corresponding one of the wheel-side member and body-side member.

The present mode is a mode that is advantageous where the stationary element is elastically supported by the wheel-side member. Described in detail, where the stationary element is elastically supported by the wheel-side member, the present electromagnetic absorber is constructed to practically have an "unsprung dynamic damper", since the stationary element functions as an inertial mass body (hereinafter referred to as "mass body" or "mass" where appropriate). In general, in an electromagnetic absorber, the damping force based on the force generated by the electromagnetic motor is controlled by controlling an operation of the electromagnetic motor based on, for example, displacement of the wheel holder, displacement of the mount portion, and amount, velocity and acceleration of the relative movement of the wheel holder and the mount portion. However, there is a possibility that a damping force control cannot be appropriately performed onto vibrations that have relatively high frequency such as unsprung-portion resonance frequency, frequency close to the unsprung-portion resonance frequency and frequency higher than the unsprung-portion resonance frequency, due to reasons such as difficulty of control following the high frequency vibrations. In view of this, in the mode provided with function of the unsprung dynamic damper, it is possible to effectively absorb unsprung-portion vibrations having relatively high frequency, without relying on the damping force generated by the electromagnetic motor, thereby making it possible to effectively restrain transmission of the unsprung-portion vibrations to a sprung portion of the vehicle. Further, the provision of function of the unsprung dynamic damper can lead to also an improvement in road holding (e.g., a reduction in fluctuation of load which acts on the wheel in a direction that causes the wheel to be in contact with a road surface).

From point of such a view, the electromagnetic absorber can be provided with a high performance, where the features of the present mode are combined with the arrangement in which the stationary element is elastically supported by the wheel-side member. Particularly, where the electromagnetic absorber is controlled based on skyhook theory, the control can be satisfactorily performed since the vibrations of high frequency can be retrained from transmitted from an unsprung portion of the vehicle to the sprung portion of the vehicle. It is noted that a weight of the stationary element as the mass, a spring constant of the elastic body supporting the stationary element in an elastic manner, and a damping coefficient as a characteristic value of a device configured to generate a damping force acting against the relative movement of the stationary element and the one-side member (in case of presence of such a device) can be determined depending on design specification and desired characteristics of a suspension system in which the electromagnetic absorber is to be employed.

(6) The electromagnetic shock absorber according to mode (5), wherein the rotatable element of the electromagnetic motor is provided in the one of the externally threaded portion and the internally threaded portion.

The electromagnetic motor may be configured to apply the force to one of the externally threaded portion and internally threaded portion, either directly or indirectly via a transmitting device such as a gear mechanism. The present mode is a mode in which the force generated by the rotary motor is caused to act directly on one of the externally threaded portion and internally threaded portion. For example, the present mode encompasses a mode in which the axis of the screw mechanism and the rotary axis of the rotatable element, i.e., the motor axis are coaxial with each other. Specifically described, the present mode encompasses a mode in which the rotatable element is connected directly to the externally threaded portion or internally threaded portion and a mode in which the externally threaded portion or internally threaded portion serves also as the rotatable element. According to the present mode, the electromagnetic absorber can be relatively simply constructed.

(7) The electromagnetic shock absorber according to any one of modes (1)-(3), wherein the electromagnetic motor is a linear motor such that the movable element is linearly movable relative to the stationary element.

The present mode is a mode in which the motor can be protected from the vibrations applied to the motor in case of employment of the linear motor as the electromagnetic motor.

(8) The electromagnetic shock absorber according to mode (7), wherein the movable element of the electromagnetic motor is provided in the other of the wheel-side member and the body-side member whereby the damping force generator is capable of generating, based on the force generated by the electromagnetic motor, the damping force acting against the relative movement of the wheel-side member and the body-side member.

The linear motor is a motor that is configured inherently to allow the relative movement of the stationary element and the movable element in the direction of the motor axis, i.e., in a relative movement direction in which the stationary element and the movable element are to be moved relative to each other. The linear motor is configured to generate the force acting in the relative movement direction, by generating an electromagnetic force acting between the stationary element and the movable element. Therefore, according to the present mode, it is possible to allow the relative movement of the stationary element and the movable element in the axial direction, and to arrange the stationary element to be elastically supported by the one-side member, without considerably changing the construction of the motor. Since the both-members relative movement is the same in direction as a relative movement of the one-side member and the stationary element (hereinafter referred to as "one-side-member vis-à-vis stationary-element relative movement" where appropriate), the motor force acting on the both-members relative movement is influenced by a relative movement position of the stationary element and the one-side member in the latter relative movement. Described in detail, since energized phases of the motor are switched based on the relative position of the stationary element and the movable element in the direction of the motor axis, in the present mode, it is preferable to monitor a relative displacement of the stationary element and the movable element that is caused as a result of the one-side-member vis-à-vis stationary-element relative movement, and to control the electromagnetic motor, specifically, control switching of the energized phases of the motor, based on the monitored relative displacement of the stationary element and the movable element.

(9) The electromagnetic shock absorber according to mode (8), including:

a both-members-relative-position sensor configured to detect a relative position of the wheel-side member and the body-side member in the both-members-relative-movement direction; and a one-side-member vis-à-vis stationary-element relative-position sensor configured to detect a relative position of the stationary element and the one of the wheel-side member and the body-side member in the both-members-relative-movement direction, wherein the electromagnetic motor is controlled based on detected values detected by the both-members-relative-position sensor and the one-side-member vis-à-vis stationary-element relative-position sensor.

(10) The electromagnetic shock absorber according to any one of modes (7)-(9), wherein the electromagnetic motor is controlled based on a relative position of the stationary element and the movable element in the both-members-relative-movement direction.

Each of the above-described two modes is a mode in which a limitation or limitations as to the control of the electromagnetic motor are added in case of employment of the linear motor as the electromagnetic motor. According to the above-described two modes, the damping force can be appropriately controlled by eliminating an influence of the relative displacement of the stationary element and the movable element that is caused as a result of the above-described one-side-member vis-à-vis stationary-element relative movement. According to a former one of the above-described two modes, the relative movement of the stationary element and the movable element in the axial direction can be monitored through the detected values detected by the two sensors. In this sense, the former one of the two modes can be considered as more specific concept of a latter one of the two modes.

(11) The electromagnetic shock absorber according to any one of modes (1)-(10), including a damper device configured to generate a damping force acting against the movement of the stationary element relative to the one of the wheel-side member and the body-side member.

The present mode is a mode that is effective to, particularly, case in which the rotary motor is employed and the function of the unsprung dynamic damper is provided. By causing the damper device to appropriately generate the damping force against the relative movement of the one-side member and the stationary element that functions as the mass, it is possible to cause the unsprung dynamic damper to exhibit the effect of absorbing the vibrations in a relatively wide frequency range, namely, the effect of restraining the transmission of the vibrations to a sprung portion of the vehicle.

BEST MODE FOR CARRYING OUT THE INVENTION

There will be described embodiments of the present invention, by reference to the accompanying drawings. It is to be understood that the claimable invention is not limited to the following embodiments, and may be otherwise embodied with various changes and modifications, such as those described in the foregoing "MODES OF THE INVENTION", which may occur to those skilled in the art.

First Embodiment a) Construction of Electromagnetic Shock Absorber

Figure 1:
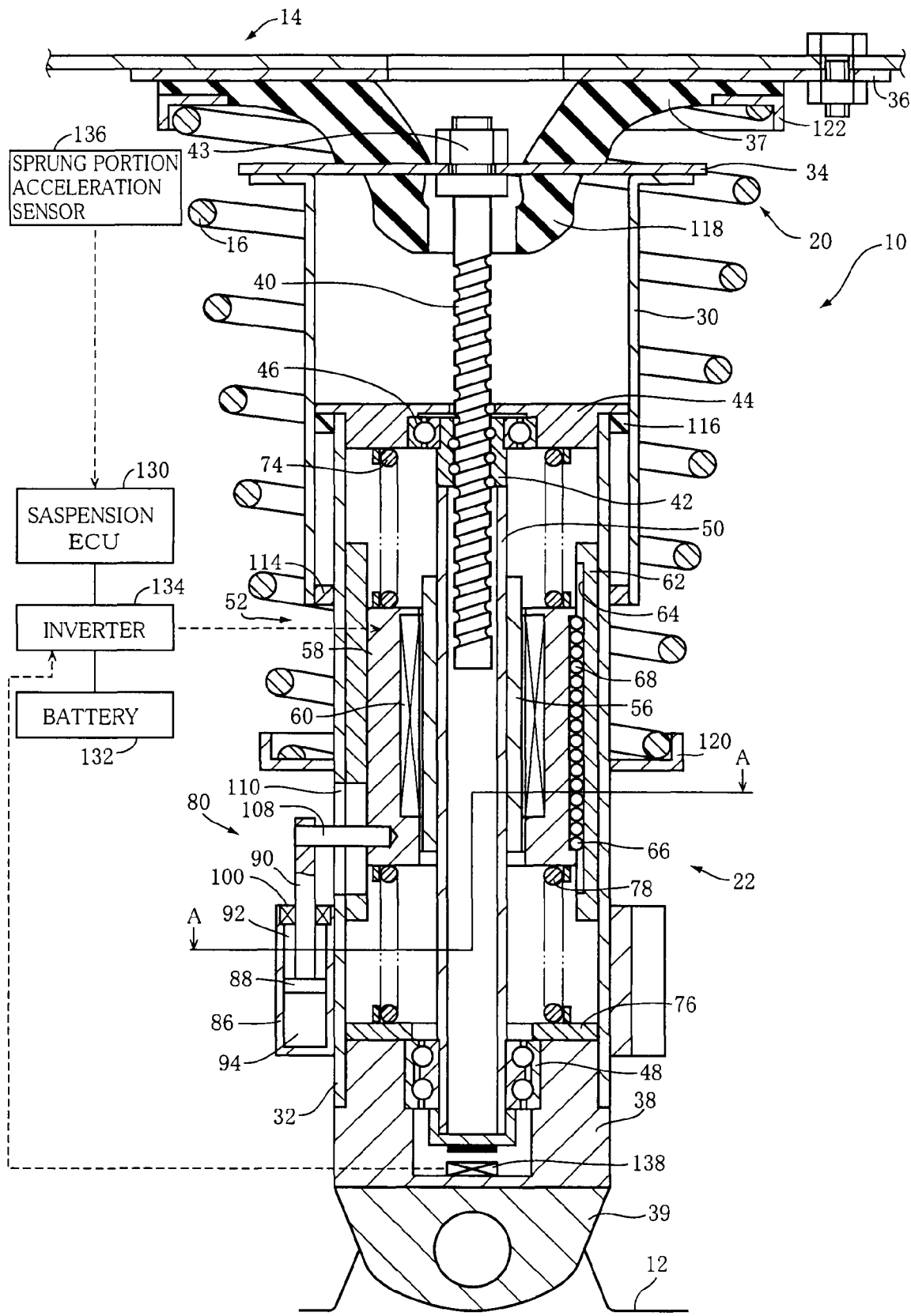
FIG. 1 is a front cross sectional view of a vehicle electromagnetic shock absorber of a first embodiment of the invention.

FIG. 1 shows an electromagnetic shock absorber 10 for a vehicle according to a first embodiment of the invention. This electromagnetic absorber 10 is one of components constituting a suspension system of independent type, and is provided for each of front right, front left, rear right and rear left wheels of the vehicle. The present electromagnetic absorber 10 is disposed between a suspension lower arm (hereinafter abbreviated as "lower arm" where appropriate) 12 and a mount portion 14. The lower arm 12 constitutes a wheel holder that holds the wheel, while the mount portion 14 is provided in a part (an upper portion of a tire housing) of the vehicle body. A suspension device provided for each wheel is constructed to include this electromagnetic absorber 10 and a coil spring 16 as a suspension spring. In the present embodiment, the present electromagnetic absorber 10 is applied in the suspension device using the coil spring as the suspension spring. However, the present electromagnetic absorber 10 is applicable also in a suspension device using, as the suspension spring, a fluid pressure spring such as an air spring. This is true also for the other embodiments.

The electromagnetic absorber 10 is constituted principally by an outer tube 20 functioning as a body-side member and an inner tube 22 functioning as a wheel-side member. The outer tube 20 and the inner tube 22 are constituted principally by an outer tube body 30 (hereinafter abbreviated as "tube body 30" where appropriate) and an inner tube body 32 (hereinafter abbreviated as "tube body 32" where appropriate), respectively, each of which is formed to have a pipe-like shape. The outer tube 20 and the inner tube 22 mate with each other, with an upper portion of the inner tube body 32 being fitted in a lower portion of the outer tube body 30.

The outer tube 20 has a top plate 34 provided in an upper end portion of the tube body 30, an attachment plate 36 and a rubber vibration isolator 37 that is interposed between and bonded to the top plate 34 and the attachment plate 36. The outer tube 20 is connected at the attachment plate 36 to the mount portion 14. Meanwhile, the inner tube 22 has a lower cap 38 that is fixed to a lower end portion of the tube body 32 so as to close the lower end portion of the tube body and an attachment member 39 which has an attachment hole formed therethrough and which is fixed to a lower portion of the lower cap 38. The inner tube 22 is connected at the attachment member 39 to the lower arm 12.

The electromagnetic absorber 10 has a ball screw mechanism including a screw rod 40 as an externally threaded portion and a nut 42 as an internally threaded portion. The nut 42 holds bearing balls and is engaged with the screw rod 40 having a thread groove formed therein. The screw rod 40 is fastened at its upper end portion to the top plate 34 with use of a nut 43, so as to be fixed to the outer tube 20. The screw rod 40 is disposed such that its own axis coincides with a line (hereinafter referred to as "absorber axis" where appropriate) connecting a center of the mount portion 14 and a portion of the lower arm 12 to which the inner tube 22 is attached. The absorber axis extends in a direction that is hereinafter referred to as "absorber axial direction" or simply "axial direction" where appropriate. Meanwhile, the nut 42 is held by the inner tube 22 while being held in thread engagement with the screw rod 40. Described in detail, the inner tube 22 has an upper cap 44 that closes an upper end portion of the inner tube body 32, and the nut 42 is held by the upper cap 44 via a bearing 46. The electromagnetic absorber 10 is disposed such that its axis coincides with the absorber axis, and has a nut holder tube 50 that is rotatably held by the lower cap 38 via a bearing 48. The nut 42 is connected at its lower end portion to an upper end portion of the nut holder tube 50. Owing to such a construction, the nut 42 and the nut holder tube 50 are held within the inner tube 22, and are rotatable about the absorber axis.

Further, the electromagnetic absorber 10 has an electromagnetic motor 52 (which is a so-called DC brushless motor and is hereinafter simply referred to as "motor 52" where appropriate). The motor 52 is constructed such that its motor shaft is provided by a part of the nut holder tube 50. A plurality of permanent magnets 56 are fixedly disposed on an outer periphery of the part of the tube 50 that provides the motor shaft, so that a rotor of the motor 52 is constructed to include the permanent magnets 56 and the part of the tube 50 that provides the motor shaft. The motor 52 has a plurality of coils 60 which are fixedly held in a coil casing 58 and which are disposed to be opposed to the permanent magnets 56, so that a stator of the motor 52 is constructed to include the coils 60 and the coil casing 58.

Figure 2:
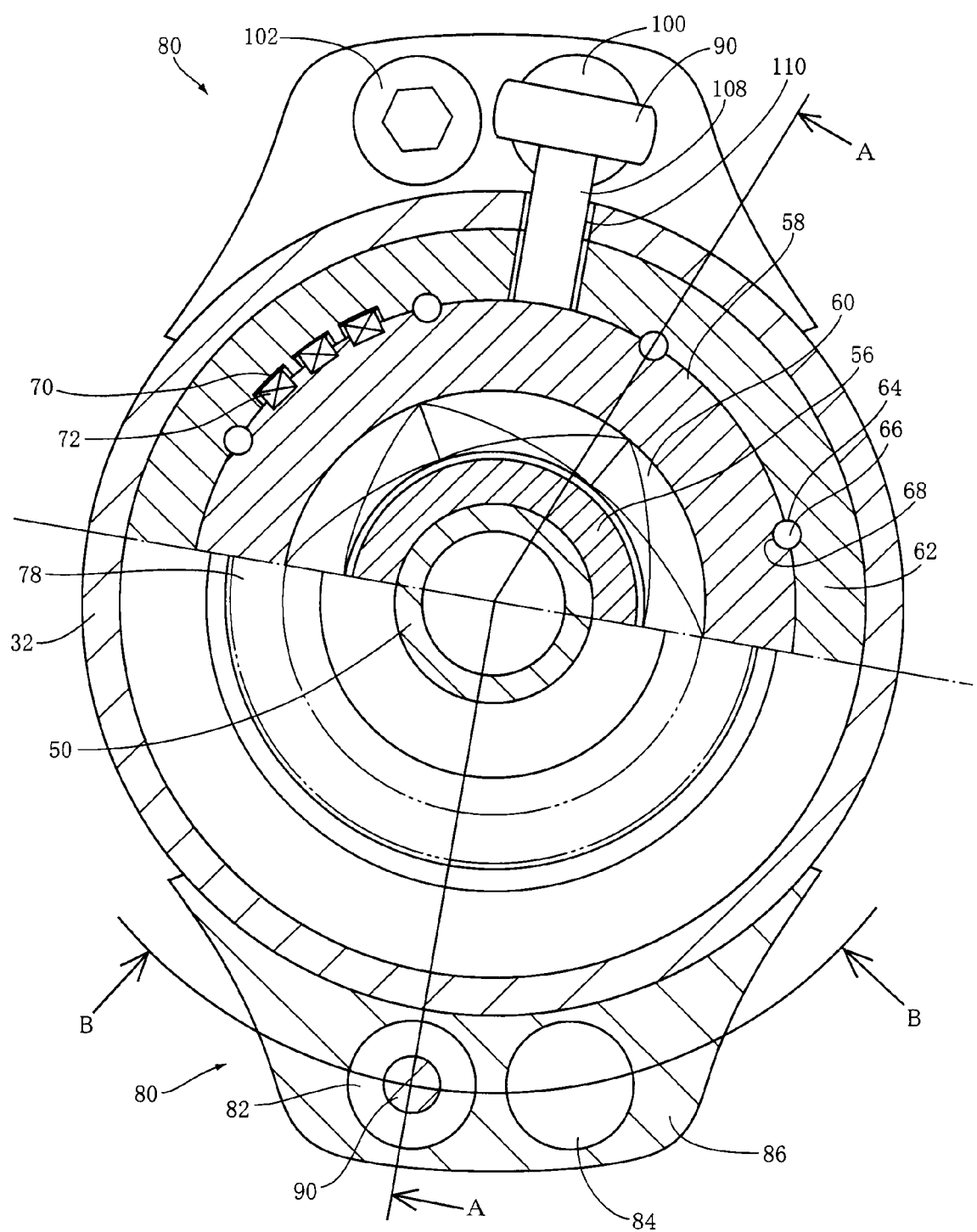
FIG. 2 is a cross sectional view of the electromagnetic absorber of FIG. 1, taken along line A-A in FIG. 1.

A holder sleeve 62 is fixedly disposed on an inner circumferential surface of the inner tube body 32. The holder sleeve 62 is formed with spline grooves 64 each extending generally in the axial direction, while the coil casing 58 is formed with ball passages 68 each extending generally in the axial direction. The spline grooves 64 are positioned in respective eight portions of an inner circumferential surface of the holder sleeve 62 that are equally spaced apart from each other in a direction of circumference of the holder sleeve 62, as seen in FIG. 2 (that is a cross sectional view taken along line A-A in FIG. 1). Similarly, the ball passages 68 are positioned in respective eight portions of an outer circumferential surface of the coil casing 58 that are equally spaced apart from each other in a direction of circumference of the coil casing 58, as seen in FIG. 2. Bearing balls 66 are received in the ball passages 68 so as to be circulated in the ball passages 68. That is, the coil casing 58, holder sleeve 62 and bearing balls 66 cooperate to constitute a ball spline mechanism by which the inner tube 22 is unrotatable and axially movable relative to the coils 60 and coil casing 58. Thus, the present electromagnetic absorber 10 is configured to allow a relative movement (hereinafter referred to as "one-side-member vis-à-vis stationary-element relative movement" or simply referred to as "movement of the coils 60" where appropriate) of the above-described one-side member in the form of the inner tube 22 as the wheel-side member and the stator of the motor 52 in the form of the coils 60 and coil casing 58. Owing to such a construction, the present electromagnetic absorber 10 is configured to permit a relative movement of the permanent magnets 56 and the coils 60, i.e., a relative movement of the rotor and the stator of the motor 52 in the axial direction, upon the movement of the coils 60. A length of each of the permanent magnets 56 as measured in the axial direction is larger than a length of each of the stator coils 60 as measured in the axial direction, such that the permanent magnets 56 are opposed to the coils 60 at the same electromagnetic condition even when the coils 60 are displaced relative to the permanent magnets 56 in the axial direction. Further, the motor 52 can be energized through an arrangement which is designed in view of the movement of the coils 60 and which include three energizing strips 70 and three brushes 72. The three energizing strips 70 are provided on an inner circumferential surface of the holder sleeve 62 so as to extend in the axial direction, while the three brushes 72 are provided on an outer circumferential surface of the coil casing 58 so as to be held in slidable contact with the respective three energizing strips 70.

Further, in the present electromagnetic absorber 10, the coils 60 and the coil casing 58 are elastically supported by the inner tube 22 as the one-side member. Described in detail, the electromagnetic absorber 10 has two springs, i.e., a spring 74 held at its upper end portion by the upper cap 44 and a spring 78 held at its lower end portion by an annular-shaped support member 76 that is provided in a lower portion of an inner periphery of the tube body 32. The coil casing 58 is gripped between the springs 74, 78, whereby the coils 60 and the coil casing 58 are elastically supported and displaceable in the axial direction owing to elasticity of the springs 74, 78 that serve as elastic bodies. That is, in the present electromagnetic absorber 10, it is possible to restrain the transmission of the vibrations from the wheel to the motor 52, owing to the construction in which the stationary element is supported by the inner tube 22 in a floating manner, and it is possible to effectively prevent or reduce adverse influence of the transmitted vibrations onto the motor 52, owing to the arrangement that allows the relative movement of the coils 60 and the permanent magnets 56 upon the movements of the coils 60, as described above.

Owing to the above-described construction in which the coils 60 and coil casing 58 are elastically supported by the inner tube 22 while the axial movement of the coils 60 and coil casing 58 relative to the inner tube 22 is allowed, the present electromagnetic absorber 10 is given a portion that functions as an unsprung dynamic damper. That is, the unsprung dynamic damper is constructed to have an inertial mass body (mass) in the form of the coils 60 and coil casing 58, so that so-called unsprung-portion vibrations are damped or absorbed owing to effect of the unsprung dynamic damper. The present electromagnetic absorber 10 is designed to be capable of absorbing the unsprung-portion vibrations having unsprung resonance frequency and frequency close to the unsprung-portion resonance frequency.

Figure 3:
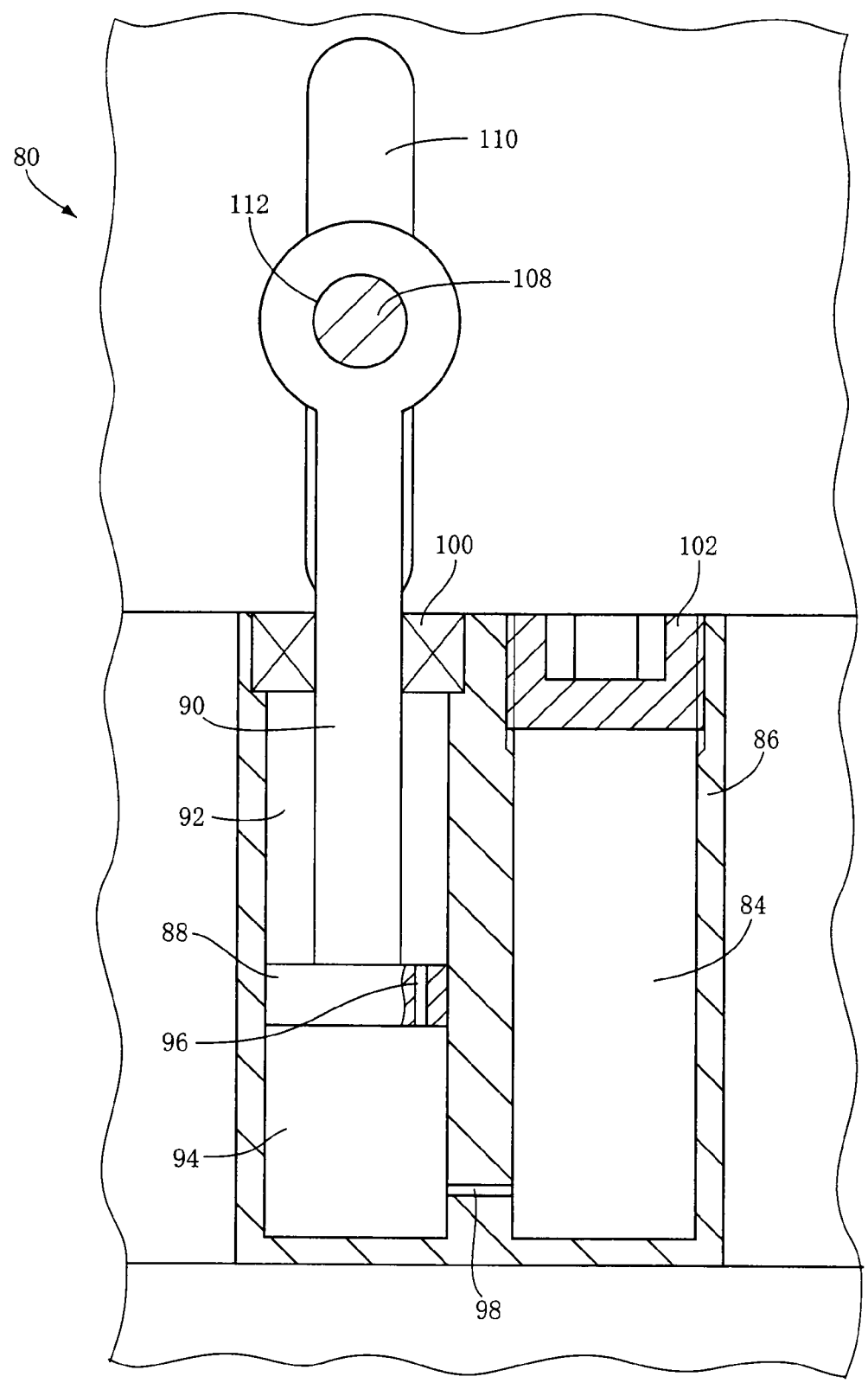
FIG. 3 is a cross sectional view of the electromagnetic absorber of FIG. 1, taken along line B-B in FIG. 2.

Further, the present electromagnetic shock absorber 10 has, as a damper device configured to generate a damping force acting against the movement of the coils 60 of the motor 52, a pair of dampers 80 as shown in detail in FIG. 2 and FIG. 3 that is a cross sectional view taken along line B-B in FIG. 2. The pair of dampers 80 are identical in construction with each other. Each of the dampers 80 is constructed to include a damper housing 86, a piston 88 and a piston rod 90. The damper housing 86 defines a piston chamber 82 filled with a working fluid and a buffer chamber 84 storing the working fluid. The piston 88 is slidably fitted in the piston chamber 82. The piston rod 90 includes a lower end portion that is connected to the piston 88 and an upper end portion that projects upwardly from the damper housing 86. The damper housing 86 of each of the dampers 80 is fixedly disposed in an outer peripheral portion of the inner tube body 32. The piston chamber 82 is sectioned by the piston 88 into an upper chamber 92 and a lower chamber 94. The piston 88 has a communication passage 96 formed therein for enabling flow of the working fluid between the upper and lower chambers 92, 94. The damper housing 86 has a communication passage 98 formed therein for enabling flow of the working fluid between the lower chamber 94 and the buffer chamber 84. A seal 100 is provided in an upper end portion of the piston chamber 82, while a plug 102 is provided to close the buffer chamber 84, for preventing leakage of the working fluid from the chambers 82, 84. Further, a connection pin 108 is provided in a lower portion of the coil casing 58. This connection pin 108 extends perpendicularly to the axial direction, and is fitted in a hole that is formed in the coil casing 58. The connection pin 108 extends from the coil casing 58 toward outside of the tube body 32, passing through a slot 110 which is formed through the inner tube body 32 and the holder sleeve 62 and is elongated in the axial direction. A portion of the connection pin 108, which projects out of the tube body 32, is fitted in a connection hole 112 that is provided in an upper end portion of the piston rod 90. Owing to such a construction, the piston 88 is upwardly or downwardly moved upon the movement of the coils 60, and each of the communication passages 96, 98 functions an orifice passage for restricting flow of the working fluid within the damper housing 86 upon the vertical movement of the piston 88, so that each of the dampers 80 generates the damping force against the movement of the coils 60. The function of the above-described unsprung dynamic damper is made more effective by an effect provided by the dampers 80. That is, the dampers 80 serve to increase a frequency range over which the unsprung-portion vibrations can be damped or absorbed, and assures effectiveness of the performance of the unsprung dynamic damper.

In the present electromagnetic absorber 10, upon a relative movement of the vehicle body and the wheel, the outer tube 20 functioning as the body-side member and the inner tube 22 functioning as the wheel-side member are moved relative to each other in the axial direction (hereinafter referred to as "both-members relative movement" or "tubes relative movement" where appropriate). As a result of the relative movement of the outer and inner tubes 20, 22, the screw rod 40 and the nut 42 are moved relative to each other in the axial direction, while the nut 42 is rotated relative to the screw rod 40. The motor 52 is arranged to be capable of applying a rotational torque to the nut 42, namely, applying a relative rotational torque to the screw rod 40 and the nut 42. Thus, by appropriately setting a direction and an amount of the applied torque, it is possible to generate an appropriate resistance force acting in a direction that inhibits the tubes relative movement. This resistance force serves as a damping force acting against the tubes relative movement, i.e., a damping force acting against the vertical movement of the vehicle body and the wheel toward and away from each other. That is, the electromagnetic absorber 10 is constructed to include a damping force generator which is constructed to include the above-described screw mechanism and the motor 52 and which is configured to generate the damping force acting against the both-members relative movement.

As described above, the present electromagnetic absorber 10 has the function of generating the damping force which is based on the force generated by the electromagnetic motor 52 and which acts against the relative movement of the vehicle body and the wheel. In addition, the present electromagnetic absorber 10 has also the function of positively moving the outer and inner tubes 20, 22 in the axial direction by a drive force of the motor 52, and the function of inhibiting the outer and inner tubes 20, 22 from being moved relative to each other by application of an external force thereto. These functions make it possible to perform a damping force control based on skyhook theory according to an absolute value of velocity of a sprung portion of the vehicle, a vehicle-body posture control for restraining roll and pitch of the vehicle body which are caused upon cornering of the vehicle and braking of the vehicle, respectively, and a so-called vehicle height adjustment control.

An annular-shaped engager member 114 is provided on an inner surface of a lower end portion of the outer tube body 30, while an annular-shaped rubber buffer 116 is provided on an outer surface of an upper end portion of the inner tube body 32 and is supported at its upper surface by the upper cap 44. Further, another rubber buffer 118 is bonded to a lower surface of the top plate 34 of the outer tube 20. During the above-described tubes relative movement, an upper surface of the upper cap 44 is brought into contact with the rubber buffer 118 when the inner tube 22 is upwardly moved relative to the outer tube 20 by a certain distance, and the engager member 114 is brought into contact with the rubber buffer 116 when the inner tube 22 is downwardly moved relative to the outer tube 20 by a certain distance. That is, in the present electromagnetic absorber 10, such a construction constitutes stoppers against the movement of the vehicle body and the wheel toward and away from each other, i.e., a bound stopper and a rebound stopper. Further, an annular-shaped lower retainer 120 is fixedly provided on an outer peripheral portion of the inner tube body 32, while an annular-shaped upper retainer 122 is provided to be bonded to the rubber vibration isolator 38, so that the coil spring 16 is gripped between the retainers 120, 122 so as to be held by the retainers 120, 122.

b) Controls of Electromagnetic Shock Absorber

Figure 4:
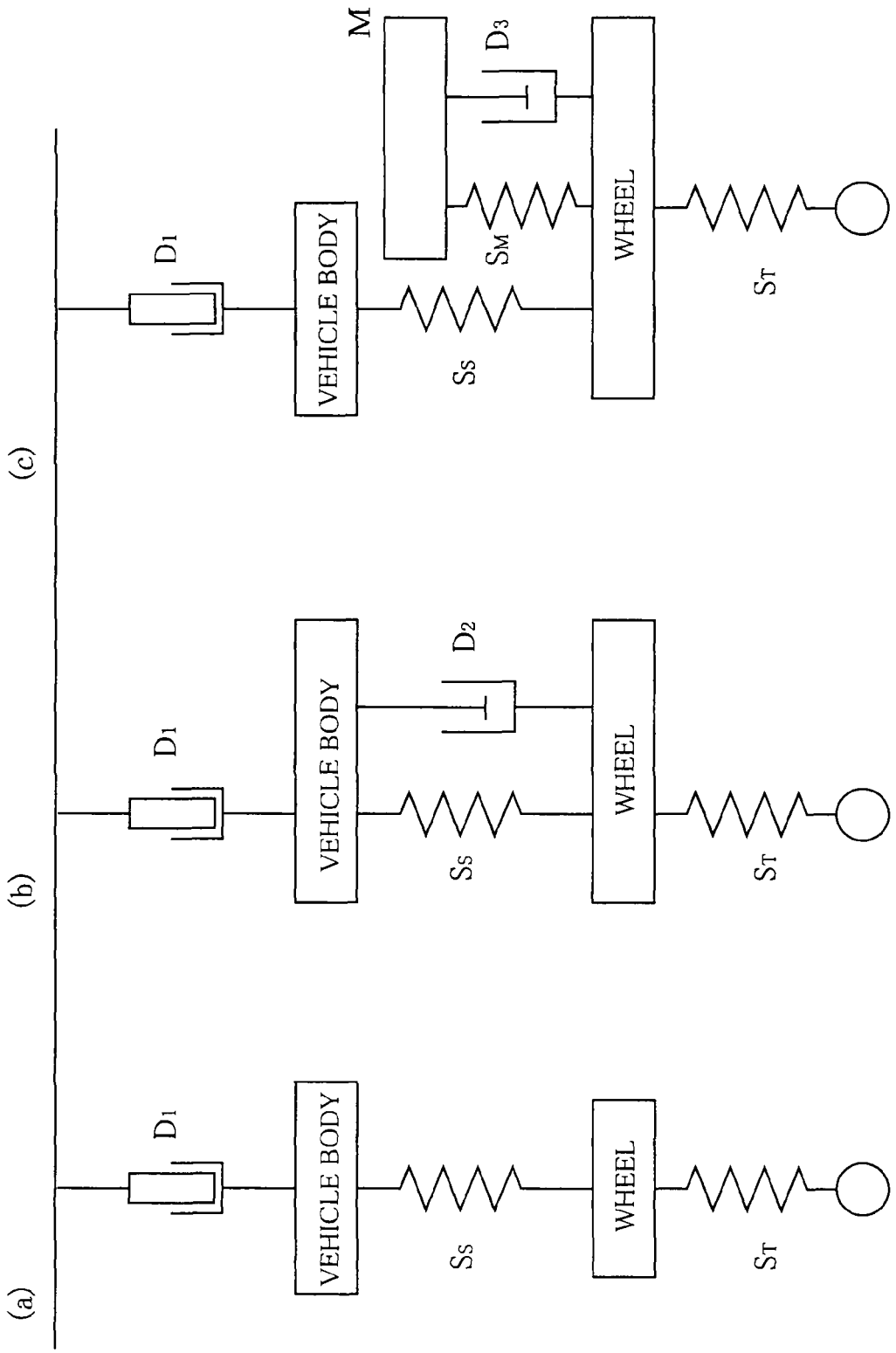
FIG. 4 is a view conceptually showing a suspension model based on skyhook theory.

Differently from a so-called hydraulic shock absorber, since the electromagnetic shock absorber is configured to easily generate the damping force whose amount is dependent on a velocity of vertical movement of the vehicle body that is the absolute value of velocity of the sprung portion of the vehicle, as described above, the electromagnetic shock absorber is advantageous to constitute a suspension device based on skyhook theory. FIG. 4 (a) shows a basic suspension model based on skyhook theory. In this model, a wheel tire is regarded as a spring $S_T$, so that the wheel is supported by the spring $S_T$, and the vehicle body and the wheel are supported by each other through a suspension spring Ss, whereby a damper device $D_1$ is configured to generate the damping force whose amount is dependent on the velocity of vertical movement of the vehicle body. However, in case of such a model, it is not possible to effectively damp vibrations of the wheel as an unsprung portion of the vehicle, thereby causing, for example, a problem that a road holding of the wheel cannot be satisfactorily maintained. In view of such a problem, it is possible to assume a model, as shown in FIG. 4 (b), in which another damper device $D_2$ is disposed between the vehicle body and the wheel. That is, the electromagnetic absorber can be controlled to generate the damping force, which is to be generated by the damper devices $D_1$ and $D_2$ for absorbing the unsprung-portion vibrations according to this model. However, the electromagnetic absorber cannot be expected to exhibit an effect of sufficiently damping the vibrations of the wheel having relatively high frequency such as unsprung-portion resonance frequency and frequency close to the unsprung-portion resonance frequency, due to reasons such as difficulty of control of the electromagnetic motor following the high frequency vibrations. Where the electromagnetic absorber is controlled according to the model shown in FIG. 4 (b), any currently available techniques do not make it possible to completely avoid the unsprung-portion resonance frequency having the relatively high frequency, from being transmitted to the vehicle body. Further, where the electromagnetic absorber is controlled according to the model shown in FIG. 4 (b), it is considered that the effect based on skyhook theory is reduced, since the unsprung-portion vibrations are received by the sprung portion of the vehicle.

Figure 5:
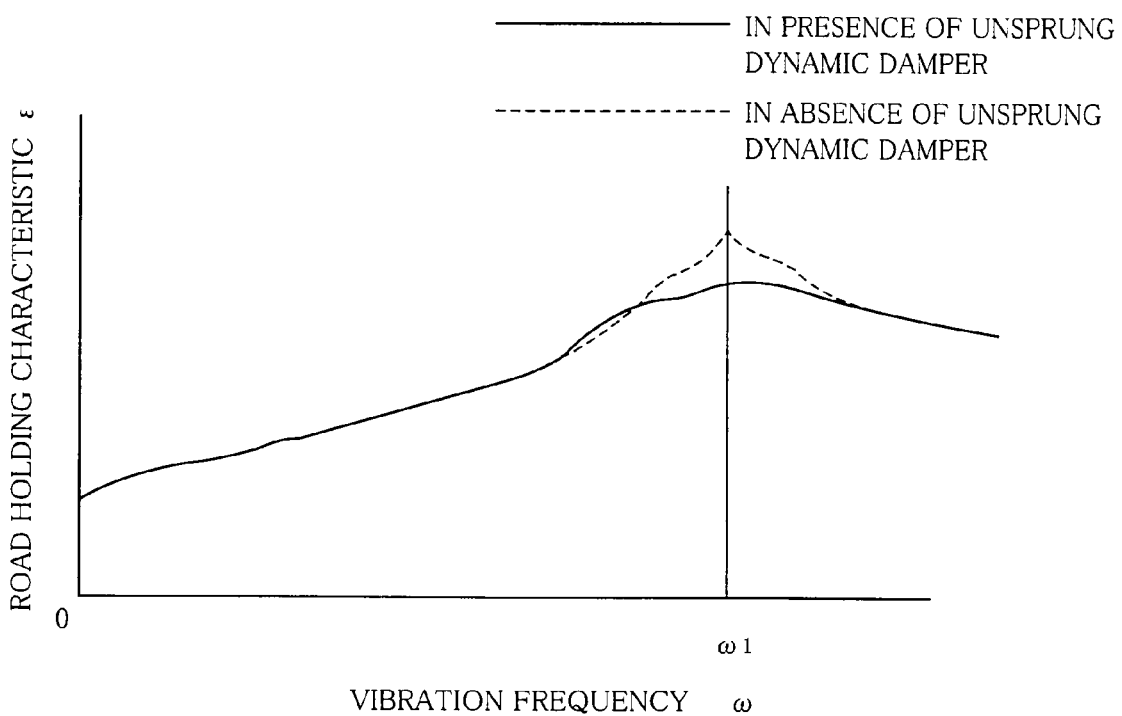
FIG. 5 is a set of graphs showing a vibration transmission characteristic and a wheel road holding characteristic in the model of FIG. 4, each of which varies depending on whether an unsprung dynamic damper is present or absent.
Figure 5:
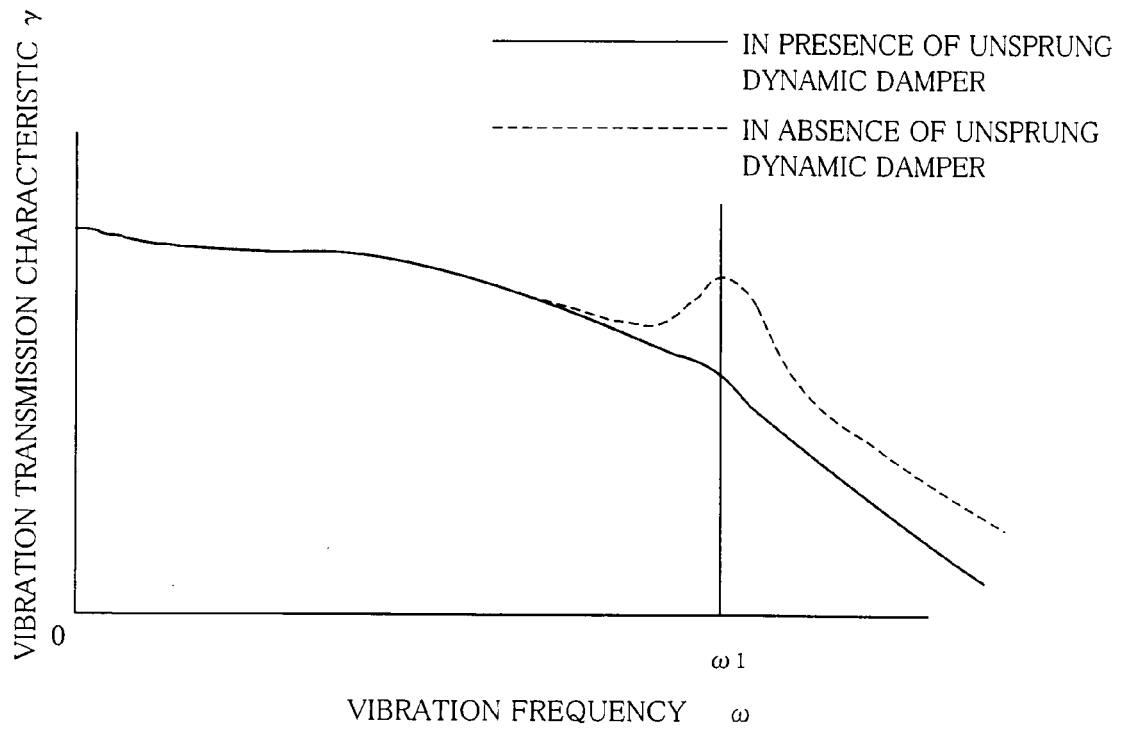

In view of the above, it is possible to assume a model, as shown in FIG. 4 (c). In this mode, a mass M is supported by the unsprung portion through a spring $S_M$, and a damper device $D_3$ is provided to apply a damping force against movement of the mass M. That is, a so-called unsprung dynamic damper is additionally provided, According to this model, the effect of the unsprung dynamic damper makes it possible to effectively absorb the unsprung-portion vibrations having a relatively high frequency, thereby restraining transmission of the unsprung-portion vibrations having frequency close to the unsprung-portion resonance frequency $\omega_1$ or frequency higher than the unsprung resonance frequency $\omega_1$, and also to improve road holding of the wheel, owing to, for example, a reduction in fluctuation of load which acts on the wheel in a direction that causes the wheel to be in contact with a road surface, as shown in FIG. 5. As described above, the present electromagnetic absorber 10, which is an electromagnetic absorber equipped with the unsprung dynamic damper, is capable of establishing an almost ideal form that realizes a suspension device based on skyhook theory.

The present electromagnetic absorber 10 is controlled by a suspension electronic control unit 130 (hereinafter abbreviated as "suspension ECU 130" or simply "ECU 130" where appropriate). Described in detail, the motor 52 is connected to a battery 132 as a power source via an inverter 134 as a drive circuit, and the ECU 130 transmits a control signal to the inverter 134 so as to control the motor 52 according to the control signal, namely, so as to control the force that is to be generated by the motor 52. Described more specifically, a sprung-portion acceleration sensor 136 is provided in vicinity of the mount portion 14 of the vehicle body, so that the ECU 130 calculates movement velocity V of the vehicle body in the vertical direction, based on detection signal supplied from the sensor 136. The ECU 130 calculates the damping force F that is to be generated by the electromagnetic absorber 10, based on the calculated velocity V and a damping coefficient C that is set based on skyhook theory, and according to the following expression:

$F=C \cdot V$

Then, the ECU 130 outputs the control signal corresponding to the damping force F, and the control signal is supplied to the inverter 134. It is noted that a rotational angle of the motor 52, i.e., a rotational angle of the rotor is detected by an angular position sensor 138 that is configured to detect a rotational angle of a lower end portion of the nut holder tube 50. A signal indicative of the detected rotational angle is transmitted to the inverter 134, so that the motor 52 is controlled by utilizing the detection signal.

c) Modification

Figure 6:
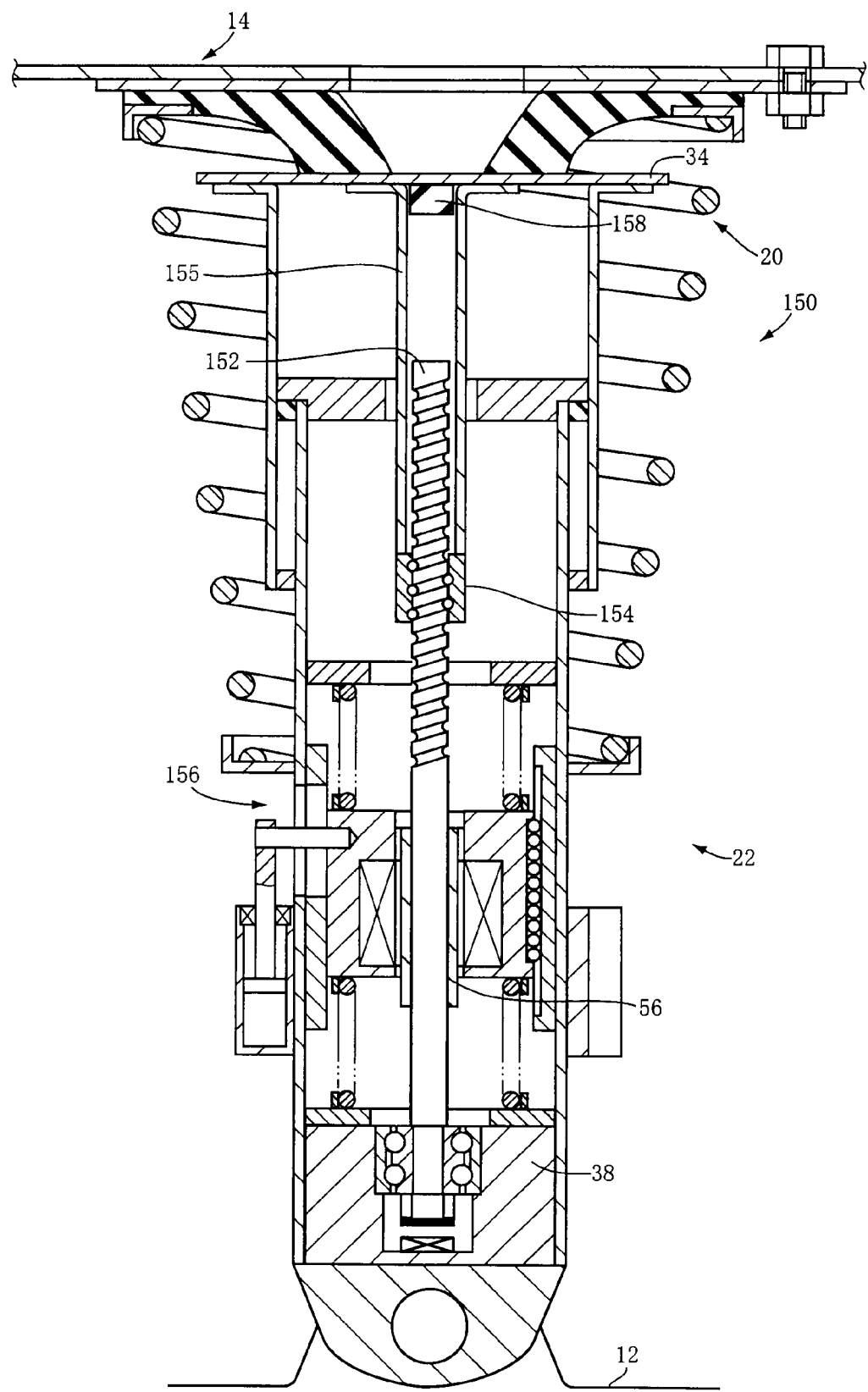
FIG. 6 is a front cross sectional view of a vehicle electromagnetic shock absorber as a modification of the electromagnetic absorber of FIG. 1.

The above-described electromagnetic absorber 10 may be modified to an electromagnetic shock absorber 150 as shown in FIG. 6. Generally described, this electromagnetic absorber 150 is configured to apply a rotational force to the externally threaded portion rather than to the internally threaded portion, while the electromagnetic absorber 10 is configured to apply the rotational force to the internally threaded portion in the form of the nut 42. With respect to the other portions, the electromagnetic absorber 150 is substantially identical in construction with the electromagnetic absorber 10, so that description of the present electromagnetic absorber 150 will be applied principally to portions different from those of the electromagnetic absorber 10. The same reference signs will be used to identify the elements having substantially the same functions, while description of the other portions is omitted or simplified.

In the present electromagnetic absorber 150, a screw rod 152 is rotatably supported by the lower cap 38 that constitutes the inner tube 22. A nut 154 is fixedly held by a nut holder tube 155 fixed to the top plate 34 that constitutes the outer tube 20. A motor 156 is constructed such that its motor shaft is provided by a part of the screw rod 152. The permanent magnets 56 constituting the rotor are fixedly disposed on an outer periphery of the part of the screw rod 152. Owing to such a construction, the rotational force generated by the motor 156 is applied to the screw rod 152, so that the damping force acting against the tubes relative movement can be generated based on the rotational force, as in the above-described electromagnetic absorber 10. In the present electromagnetic absorber 150, a bound-side end of a range of the tubes relative movement is defined by contact of an upper end of the screw rod 152 with a rubber buffer 158 that is disposed in a portion of the nut holder tube 155 that is located on a lower side of the top plate 34.

Second Embodiment

Figure 7:
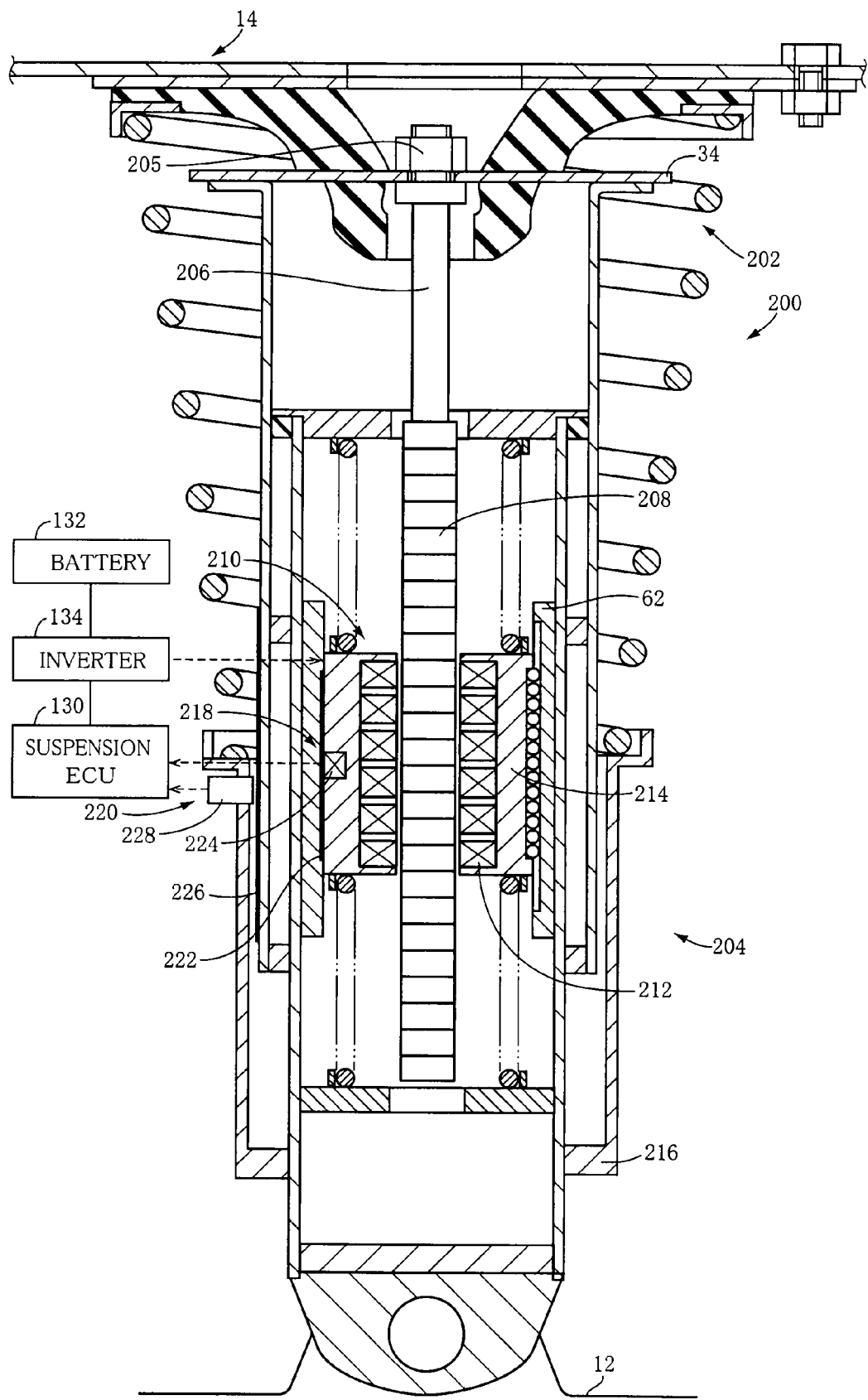
FIG. 7 is a front cross sectional view of a vehicle electromagnetic shock absorber of a second embodiment of the invention.

FIG. 7 shows an electromagnetic shock absorber 200 for a vehicle according to a second embodiment of the invention. The present electromagnetic absorber 200 employs a linear motor, while the electromagnetic absorber 10 of the above-described embodiment is equipped with the rotary motor 52. The present electromagnetic absorber 150 will be described principally with respect to portions different from those of the above-described electromagnetic absorber 10. The same reference signs will be used to identify the elements having substantially the same functions as those of the electromagnetic absorber 10, while description of the other portions is omitted or simplified.

The electromagnetic absorber 200 is constructed to include an outer tube 202 and an inner tube 204 that is fitted in the outer tube 202, like in the above-described electromagnetic absorber 10. Within the outer tube 202, there is provided a rod 206 that is fastened at its upper end portion to the top plate 34 by means of a nut 205. A plurality of annular-shaped permanent magnets 208 are disposed on an outer periphery of a lower portion of the rod 206, described in detail, on an outer periphery of a portion of the rod 206 that corresponds to two-thirds of an entirety of the rod 206 in length, such that the permanent magnets 208 are fixedly arranged in the axial direction such that magnetic poles (N, S) thereof are alternated with each other. That portion of the rod 206 and the permanent magnets 208 cooperate to constitute a mover of a motor 210 that is included in the present electromagnetic absorber 200. Meanwhile, a plurality of coils 212 are provided to be opposed to the permanent magnets 208, and are held by a coil casing 214 that is substantially the same as that employed in the above-described electromagnetic absorber 10, such that the coils 212 are arranged in the axial direction. These coils 212 and the coil casing 214 cooperate to constitute a stator of the motor 210. Like in the above-described electromagnetic absorber 10, the coils 212 and the coil casing 214 are movable relative to the inner tube 204 in the axial direction, and are elastically supported by the inner tube 204. It is noted that a lower retainer 216 generally having a tubular shape is provided on the inner tube body 32 in the present electromagnetic absorber 200.

According to the above-described construction, the outer and inner tubes 202, 204 are moved relative to each other in the axial direction upon the vertical movement of the vehicle body and the wheel toward and away from each other, and the relative movement of the outer and inner tubes 202, 204 causes the permanent magnets 208 and the coils 212, i.e., the mover and the stator of the motor 210, to be moved relative to each other in the axial direction. The motor 210 is arranged to be capable of generating the resistance force acting against the relative movement of the outer and inner tubes 202, 204, so that the present electromagnetic absorber 200 is configured to be capable of generating, based on the resistance force, the damping force acting against the above-described tubes relative movement. That is, the present electromagnetic absorber 200 has the damping force generator that is constructed to include the motor 210.

Owing to the above-described construction, in the present electromagnetic absorber 200, too, the stator of the motor 210 is supported in a floating manner whereby the vibrations transmitted from the wheel to the motor 210 are alleviated. Further, when the coils 212 and the coil casing 214 are moved relative to the inner tube 204, the above-described construction allows the coils 212 and the coil casing 214 to be moved relative to the rod 206 and the permanent magnets 208, namely, allows the relative movement of the stator and the mover, thereby making it possible to effectively prevent or reduce a negative influence of the transmitted vibrations affecting the motor 210.

In the present electromagnetic absorber 200, the control of the motor 210, i.e., the control of energization of the motor 210 is made based on the relative position of the mover and the stator in the axial direction. Described specifically, the relative position is calculated by the ECU 130 based on detection signals supplied from a stator position sensor 218 configured to detect the position of the coil casing 214 relative to the inner tube 204 in the axial direction and a tubes relative position sensor 220 configured to detect the relative position of the outer and inner tubes 202, 204 in the axial direction. Then, a signal indicative of the relative position, which has been obtained by the calculation, is transmitted from the ECU 130 to the inverter 134. The inverter 134 is configured to control the energization of the motor 210, based on the transmitted signal. The stator position sensor 218 functions as a one-side-member vis-à-vis stationary-element relative-position sensor, and is provided by a liner encoder constructed to include a gauge 222 which is provided on an inner circumferential surface of the holder sleeve 62 and a detecting element 224 which is provided on an outer peripheral portion of the coil casing 214 and which is configured to detect graduations of the gauge 222. The tubes relative position sensor 220 functions as a both-members relative-position sensor, and is provided by a liner encoder constructed to include a gauge 226 which is provided on an outer circumferential surface of the outer tube 202 and a detecting element 228 which is provided in the lower retainer 216 and which is configured to detect graduations of the gauge 226.

The invention claimed is:

1. An electromagnetic shock absorber for a vehicle, comprising:

a wheel-side member to be connected to a wheel holder that holds a wheel of the vehicle;

a body-side member to be connected to a mount portion that is provided in a body of the vehicle, and movable relative to said wheel-side member upon a movement of said wheel holder and said mount portion toward and away from each other; and a damping force generator having a rotary motor that includes a stationary element and a rotatable element rotatable relative to said stationary element, said stationary element having an electromagnetic coil, said rotatable element having a permanent magnet, said damping force generator being capable of generating, based on a force generated by said rotary motor, a damping force acting against a relative movement of said wheel-side member and said body-side member, wherein said rotary motor has an axis that extends in a both-members-relative-movement direction as a direction of the relative movement of said wheel-side member and said body-side member, wherein said stationary element is supported by said wheel-side member via an elastic body such that said stationary element is movable relative to said wheel-side member in the both-members-relative-movement direction, wherein said rotary motor has a construction allowing a relative movement of said stationary element and said rotatable element in the both-members-relative-movement direction upon a movement of said stationary element relative to said wheel-side member, wherein said stationary element functions as an inertial mass body such that said electromagnetic shock absorber has a function as an unsprung dynamic damper, and wherein a length of said permanent magnet of said rotatable element as measured in the both-members-relative-movement direction is larger than a length of said coil of said stationary element as measured in the both-members-relative-movement direction, by an amount not smaller than a distance by which said stationary element is movable relative to said wheel-side member in the both-members-relative-movement direction.

2. The electromagnetic shock absorber according to claim 1, wherein said damping force generator has a screw mechanism which includes an externally threaded portion and an internally threaded portion that are held in thread engagement with each other, and which has an axis that extends in the both-members-relative-movement direction, such that one of said externally threaded portion and said internally threaded portion is provided in one of said wheel-side member and said body-side member, and is rotatable relative to said one of said wheel-side member and said body-side member, such that the other of said externally threaded portion and said internally threaded portion is provided in the other of said wheel-side member and said body-side member, and is unrotatable relative to said other of said wheel-side member and said body-side member, and such that said one of said externally threaded portion and said internally threaded portion is rotatable upon the relative movement of said wheel-side member and said body-side member, and wherein said stationary element of said electromagnetic motor is held by said wheel-side member such that said stationary element is unrotatable relative to said wheel-side member, while said rotatable element is rotatable together with a rotation of said one of said externally threaded portion and said internally threaded portion, whereby said damping force generator is capable of generating, based on the force generated by said electromagnetic motor, the damping force acting against the relative movement of said wheel-side member and said body-side member.

3. The electromagnetic shock absorber according to claim 2, wherein said rotatable element of said rotary motor is provided in said one of said externally threaded portion and said internally threaded portion.

4. The electromagnetic shock absorber according to claim 1, comprising a damper device configured to generate a damping force acting against the movement of said stationary element relative to said wheel-side member.

5. The electromagnetic shock absorber according to claim 1, comprising a ball spline mechanism which is provided between said stationary element and said wheel-side member and which is configured to allow the movement of said stationary element relative to said wheel-side member in the both-members-relative-movement direction and to inhibit a rotation of said stationary element relative to said wheel-side member.

6. The electromagnetic shock absorber according to claim 1, wherein said electromagnetic coil is held in a coil casing, and wherein a first end of said elastic body abuts said coil casing and a second end of said elastic body abuts an annular-shaped support member provided in a lower portion of an inner periphery of a tube body of said wheel-side member.

7. The electromagnetic shock absorber according to claim 1, wherein a first end of another elastic body abuts the coil casing and a second end of the another elastic body abuts an upper cap that closes an upper end portion of the tube body of the wheel-side member.

8. The electromagnetic shock absorber according to claim 1, wherein a holder sleeve is fixedly disposed on an inner circumferential surface of the tube body of the wheel-side member, the holder sleeve is formed with spline grooves on an inner circumferential surface of the holder sleeve, each of the spline grooves extending generally in an axial direction, the coil casing is formed with ball passages on an outer circumferential surface of the coil casing, each of the ball passages extending generally in the axial direction and aligned with the spline grooves, and bearing balls are received in the ball passages such that the tube body of the wheel-side member is unrotatable and axially moveable relative to the electromagnetic coil and the coil casing.

9. The electromagnetic shock absorber according to claim 8, wherein an energizing strip is provided on the inner circumferential surface of the holder sleeve and a brush is provided on the outer circumferential surface of the coil casing so as to be held in slidable contact with the energizing strip.

10. The electromagnetic shock absorber according to claim 1, further comprising a damper disposed on an outer peripheral portion of the tube body of the wheel-side member, the damper including a damper housing defining a piston chamber filled with a working fluid and a buffer chamber storing the working fluid, a piston slidably fitted in the piston chamber, and a piston rod with a lower end connected to the piston and an upper end connected to a first end of a connection pin, wherein the second end of the connection pin is fitted in a hole formed in a lower portion of the coil casing.

* * * * *